Figure 1:
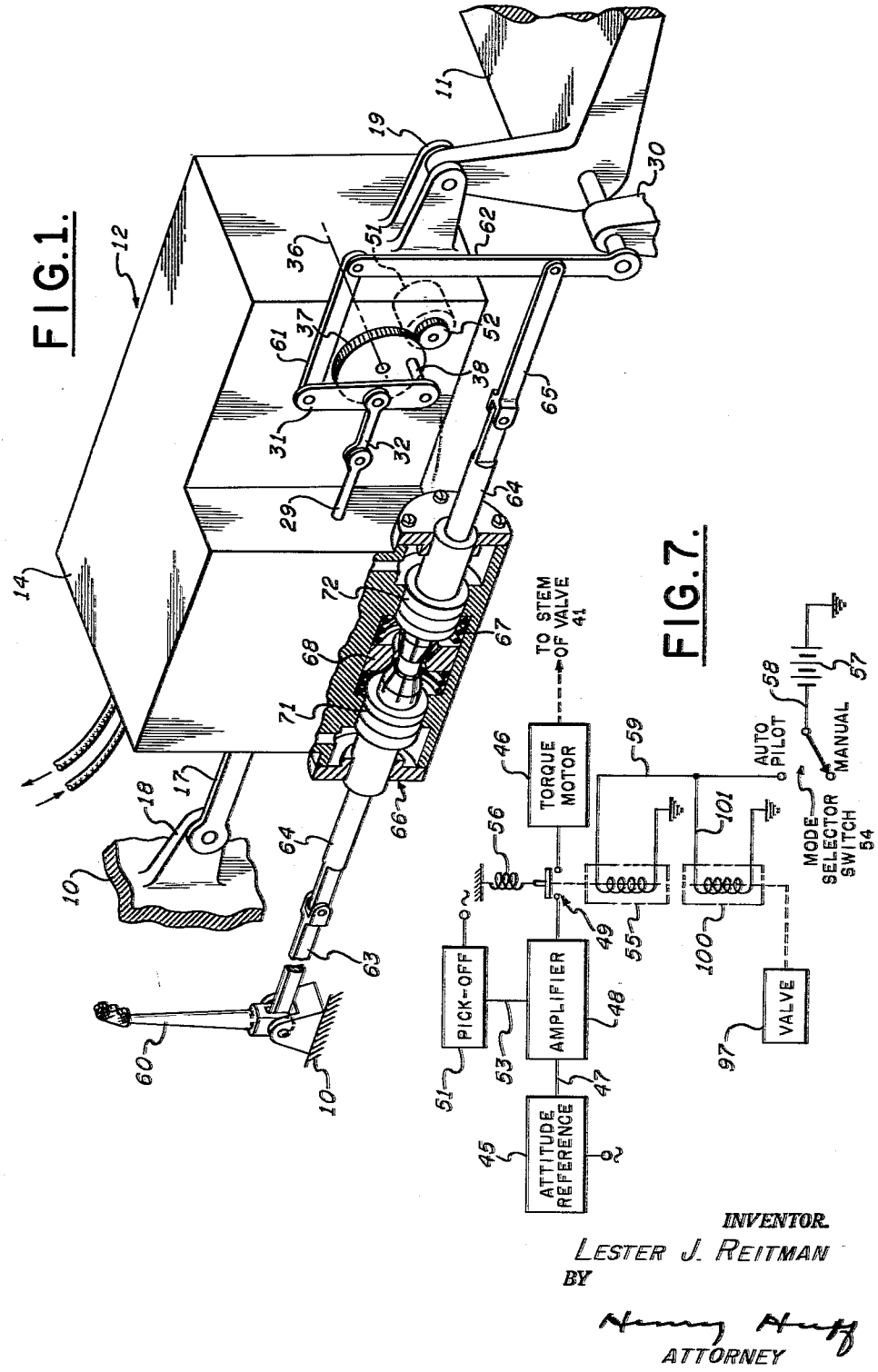

July 23, 1963

L. J. REITMAN 3,098,412

SERVO SYSTEM

Filed Aug. 4, 1961

3 Sheets-Sheet 1

INVENTOR.
LESTER J. REITMAN
BY
ATTORNEY

July 23, 1963 L. J. REITMAN 3,098,412
SERVO SYSTEM
Filed Aug. 4, 1961 3 Sheets-Sheet 3

INVENTOR.
LESTER J. REITMAN
BY
ATTORNEY

United States Patent Office 3,098,412
Patented July 23, 1963

3,098,412
SERVO SYSTEM
Lester J. Reitman, Long Beach, N.Y., assignor to Sperry
Rand Corporation, a corporation of Delaware
Filed Aug. 4, 1961, Ser. No. 129,337
9 Claims. (Cl. 91—216)

This invention relates to a manual booster servo system of the character including a servomotor of the fluid pressure input type that controls the attitude of a maneuverable craft about an axis. In the embodiment of the invention shown in the drawings, the craft is an aircraft with elevators and the booster servomotor of the system is operatively connected to the elevators to move the craft about its pitch axis.

The improved booster system includes a control valve for providing a differential fluid pressure input to the servomotor and mechanical means that are connected to provide a manual input to the control valve. The mechanical means provided includes a rod connection between the control valve and a manually operable controller or stick that is controlled by the human pilot to change the attitude of the craft about its axis. The feel of the human pilot to the response of the craft that is commanded at the stick or controller is maintained in the improved booster system by the inclusion therein of an artificial feel means or actuator having a piston on the rod of the mechanical connection that is responsive to the differential fluid pressure input to the servomotor. The improved system further includes a means including a clutch for coupling the piston of the feel means or actuator to the rod of the mechanical means of the system whose operation is dependent on the response of the feel means or actuator to the controlling differential pressure input. The responsive element or piston of the feel means or actuator of the system is coupled to the rod of the mechanical means of the system for operation in accordance with the differential pressure input to the servomotor through a fluid flow line between the feel means or actuator and the servomotor. The improved system further includes a valve in the flow line between the servomotor and feel means or actuator and a means for conditioning the valve to connect the feel means to the servomotor.

The primary object of the present invention is to provide a servomotor system for maneuverable craft that in the manual boost mode of operation, two relatively movable parts are coupled to provide artificial feel at the stick that is in accordance with the differential pressure input to the servomotor.

One of the features of the present invention resides in the provision in a servomotor system of the type described of a feel means or actuator having a piston that engages the rod of a mechanical means included in the system to provide artificial feel for the human pilot in the manual boost mode of operation.

Another feature is provided by the clutch engagement provided in the improved system in the manual boost mode between the piston of the feel means or actuator and the rod of the mechanical means connected to the stick controller.

A further feature resides in the inclusion in the system of a fluid flow line with a passageway between the feel means, actuator or device and the servomotor, a passageway to return fluid pressure and a conditionable line control valve that in a manual mode position connects the feel means to the servomotor and that in an automatic pilot position connects the feel means to the fluid pressure return passageway independently of the servomotor. Under emergency conditions when the supply fluid pressure of the system drops below a predetermined limit, the line control valve of the improved system includes a third position that connects both the servomotor and the feel means to the return fluid pressure passageway. When the system operates in an automatic mode, the line control valve connects only the feel actuator to return fluid pressure, and the provided clutch is ineffective and neither the actuator nor clutch exerts any restraint on the functional components thereof including the mechanical means and stick controller. By connecting both the servomotor and the feel means to return fluid pressure under conditions where the supply pressure falls below a predetermined limit, fluid lock between the relatively moving parts of the components is prevented, so that the elevators of the craft can then be moved mechanically by the human pilot through manipulation of the stick controller.

Figure 2:
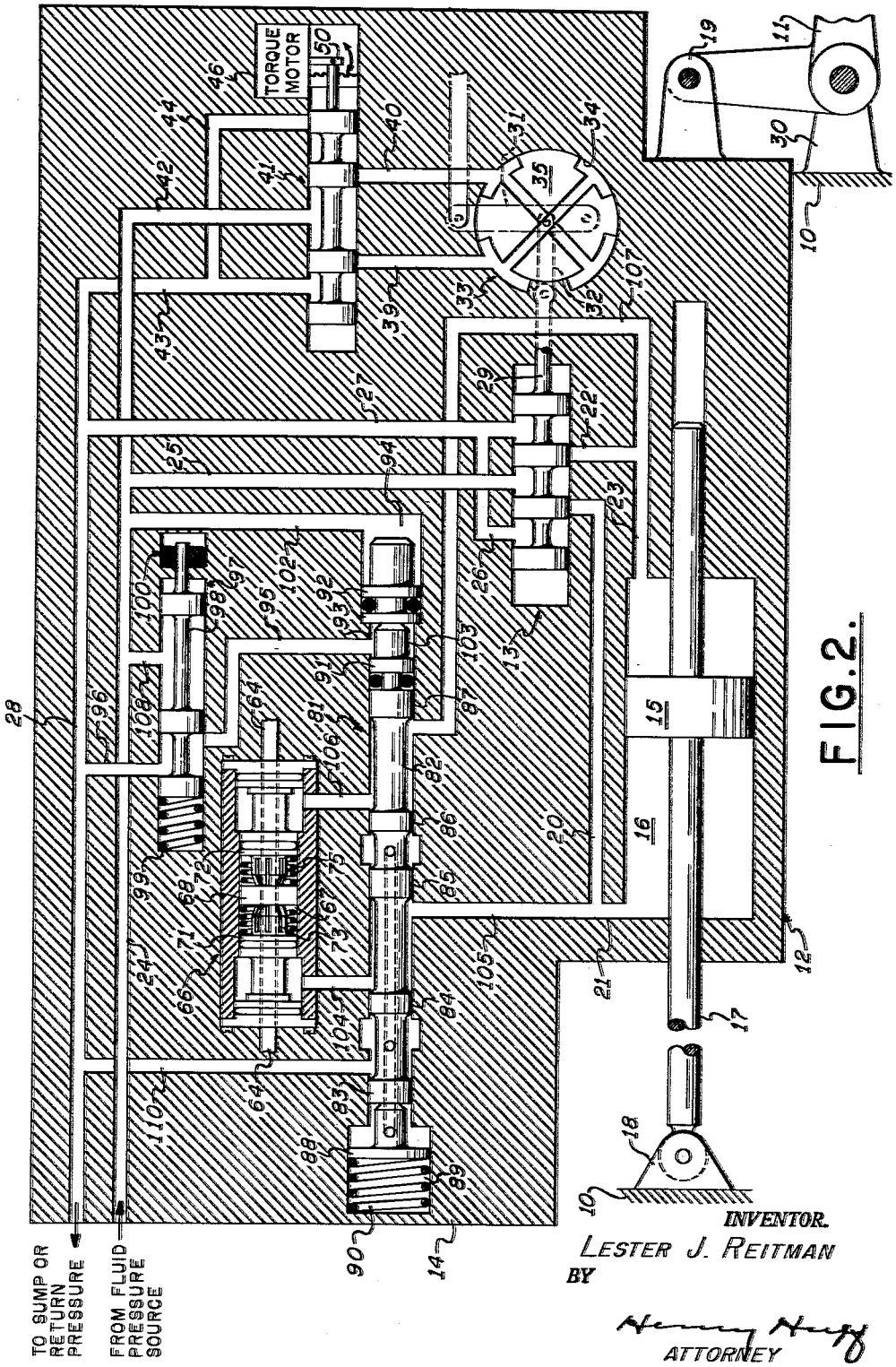
Figure 3:
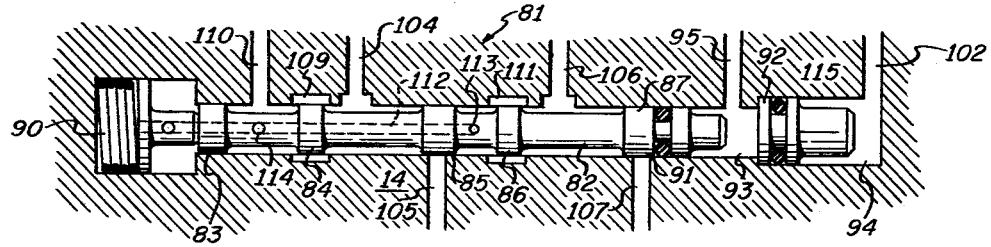
Figure 4:
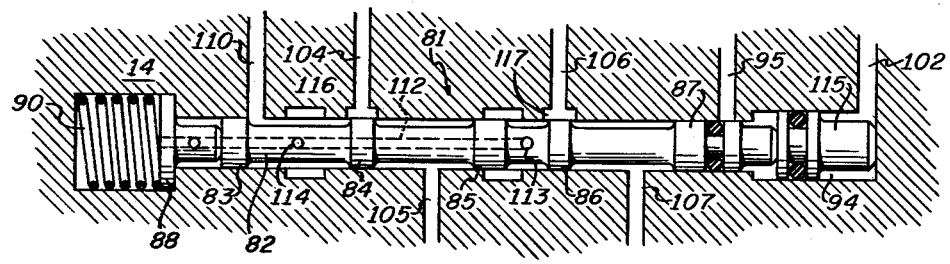
Figure 5:
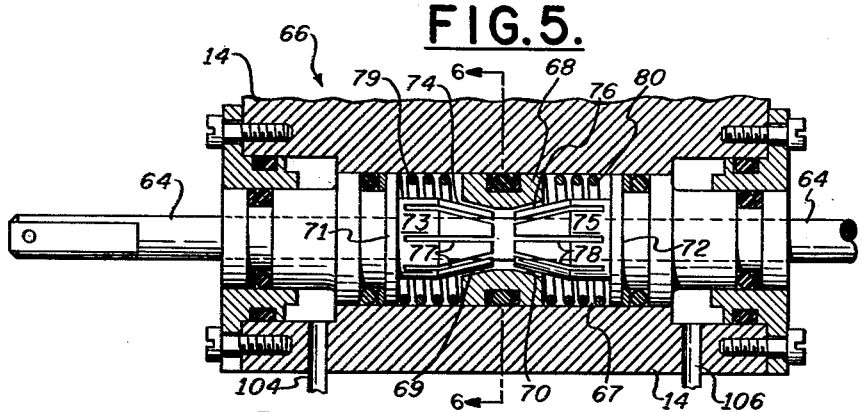
Figure 6:
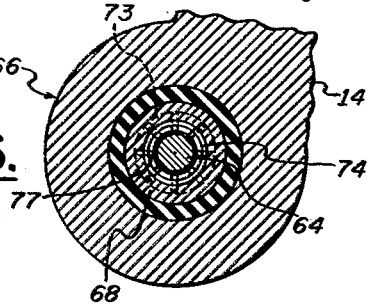

Other objects, features and structural details of the invention will be apparent from the following description when read in relation to the accompanying drawings in which, FIG. 1 is a perspective view showing an illustrative embodiment of the improved servomotor system where the servomotor is operatively connected between the frame and elevators of an aircraft and where the feel means, device or actuator of the system is shown in partial section, FIG. 2 is a mechanical schematic view showing the components of the system included in the housing of the servomotor in which the flow line control valve is shown in an operative position connecting the servomotor to the feel means, FIG. 3 is a detail sectional view of the flow line control valve showing the same in a position where the system is conditioned for automatic pilot operation with the feel means of the system being connected to return fluid pressure instead of to the servomotor, FIG. 4 is a view like FIG. 3 in which the flow line control valve of the system is shown in its third operative position where both the feel means and the servomotor are connected to the return fluid pressure passageway, FIG. 5 is an enlarged sectional view of the portion of the servomotor housing shown in FIG. 1 that includes the feel means and clutch components of the improved system, FIG. 6 is a detail cross section taken on lines 6—6, in FIG. 5, and FIG. 7 is a circuit diagram showing the automatic pilot components of the system, the mode selector switch and relay portion of the means for conditioning the flow line control valve.

As shown in FIG. 1, the improved servomotor system is embodied for use in an aircraft with a fixed chassis or frame 10 and elevators 11. The system includes a servomotor 12 of the differential pressure input type such as an hydraulic motor having a conventional control valve 13, FIG. 2, and a movable housing 14 connected to the craft to follow the motion of the valve. The piston and cylinder of the motor 12 are respectively indicated at 15 and 16 in FIG. 2. To obtain this result, in the illustrated system, the end of a piston rod 17 extending exteriorly of the housing 14 from piston 15 is pivotally connected to the chassis 10 of the craft by a suitable bearing bracket 18. Furthermore, the housing 14 is pivotally connected to the elevator 11 by means of a suitable clevis mounting 19. As shown in FIG. 2, the lands of the valve 13 differentially control the supply of fluid under pressure to the cylinder 16 of the servomotor 12 by way of connecting passageways 20 and 21 and passageways 22 and 23. The fluid input to the valve 13 is supplied from a suitable fluid pressure source represented as an input arrow, in FIG. 2, by way of passageway 24 and connecting passageway 25 in the housing 14. The return fluid line from the motor 12 through the valve 13 includes a fluid output from the housing 14 that is represented in FIG. 2 as an output arrow directed to a suitable sump or return pressure. The sump connections from the motor cylinder 16 are through one of the pairs of connecting passageways 20, 21 or 23, 22 in the housing, through the valve 13 and by way of connecting passageways 26, 27 to the return passageway 28. Accordingly, when the stem 29 of the control valve 13 moves to the left as viewed in FIG. 2, fluid under pressure is supplied to the portion of the cylinder 16 to the left of the piston 15 by way of connected passageways 24, 25, 20 and 21. The portion of the cylinder 16 to the right of the piston 15 is connected to the sump or return pressure by way of passageways 23, 22, 27 and 28. With fluid under pressure entering the cylinder 16 to the left of the piston 15, the housing 14 of the servomotor 12 moves to the left in the same direction as the valve stem 29 as a mechanical nulling followup. This action of the servomotor 12 of the system moves the elevators 11 pivotally mounted in a suitable bearing 30 on chassis 10 about its axis in a counterclockwise direction as viewed in FIG. 1 until the housing 14 has moved with relation to the valve stem 29 to cut off the supply of fluid under pressure through the valve 13 to the portion of the cylinder to the left of the piston 15. Reverse movement of the valve 13 results in the reverse operation of the servomotor 12 and movement of the elevators 11 in a clockwise direction about its axis. Either raising or lowering the elevators 11 of the craft changes its pitch attitude. The improved servomotor system accordingly operates to maneuver the craft about an axis.

The means included in the improved system to move the valve stem 29 controlling the operation of the servomotor 12 is provided by a mechanical differential or link 31 whose output is operatively connected to the stem by way of a connecting link 32. One of the inputs to the differential link 31, as shown in FIG. 2, is provided by an hydraulic motor 33 that includes a cylindrical chamber 34 in the housing 14 in which a rotary piston 35 moves about an axis 36, FIG. 1. A suitable shaft (not shown) journaled in the housing 14 in coincident relation to axis 36 connects the piston 35 to a gear 37 having an eccentric pin 38 thereon on which one end of the link 31 is pivotally mounted. Under conditions of operation where the system is functioning in an automatic pilot mode, the opposite end of link 31 may be considered to be pivotally anchored so that rotation of piston 35 about axis 36 moves the gear 37, the pin 38 and the end of the link 31 connected thereto to operate the valve stem 29 through the connecting link 32. As shown in FIG. 2, the means provided to operate the motor 33 includes differential passageways 39, 40 in the housing 14, a slide valve 41 of the same type as valve 13, fluid pressure passageways 42 to pressure passageway 24, and sump return passageways 43 and 44 to the return pressure passageway 28.

Where the system is controlled by the operation of link 31 and valve stem 29 due to rotation of the piston 35 about its axis 36, the hydraulic motor 33 is included in the system as a component of suitable automatic pilot means that provides a pitch output depending on the angular displacement of the craft from a reference attitude about its pitch axis. The automatic pilot means included in the system as shown in FIG. 7 includes an attitude reference 45 that may consist of a conventional gyro vertical having a pitch pick-off whose displacement output is fed to a torque motor 46 by way of lead 47, amplifier 48 and a lead that includes a closed switch 49. As shown in FIG. 2, the torque motor 46 has an output arm 50 that is pivotally connected to one end of the stem of the valve 41 to control the operation of the rotary hydraulic motor 33. The automatic pilot operations of the system are nulled at the input to the torque motor 46 by feedback means including a suitable pick-off or synchro 51 of the selsyn type whose rotor as shown in FIG. 1 is driven by the gear 37 through meshing gear 52. As shown in FIG. 7, the stator of the pick-off 51 is connected to provide an input to the amplifier 48 of the system by way of lead 53. The means provided for conditioning the system in the automatic pilot mode includes a mode selector switch 54 of the two pole type and a relay 55 that when energized closes the switch 49 connecting the amplifier 48 to the torque motor 46, the armature of the relay then overcoming the force of a biasing spring 56 connected to the switch. The circuit shown in FIG. 7 for supplying energy to the relay 55 includes battery 57, lead 58, mode switch 54 closed in its automatic pilot position, and lead 59 to the winding of the relay. When the mode switch 54 is set in the manual mode position, the circuit to relay 55 is opened and the switch 49 returns to open condition under the influence of spring 56 to null the input to the torque motor 46 and render the automatic pilot means ineffective.

With the mode selector switch 54 set in the manual mode position, the system is conditioned to include a manual controller or stick 60 that as shown in FIG. 1 is pivotally mounted on the chassis 10 of the craft. The mechanical means included in the system provides a manual input to the stem 29 of the control valve 13 through the connecting differential link 31. As shown, the provided mechanical connections include a link 61, one end of which is pivotally connected to the differential link 31 at the end thereof opposite to the pivotal connection thereto of the eccentric pin 38. In the manual mode of operation of the system, the manual input to the valve stem 29 may be considered to occur with movement of the link 31 about the pivotal axis connection thereto to the eccentric 38 as a fixed axis. The other end of link 61 is pivotally connected to a lever 62 pivotally mounted on the frame or chassis of the craft to move about the axis of the elevators 11. The connections between the stick 60 and lever 62 include a link 63, a reciprocative rod 64 mounted in the housing 14 of the servomotor 12 and a link 65. The rod 64 of the mechanical connection is an element of the mechanical means included in the system. As shown in FIG. 1, the rod 64 is a solid member whose ends extend exteriorly of the servomotor housing 14 and are respectively pivotally connected to the connecting links 63 and 65. The manually operated stick or controller 60 is accordingly connected through mechanical means to provide an input to the link 31 controlling the operation of the servomotor 12.

The feel means or actuator of the improved system is a device with a piston that is responsive to the differential fluid pressure input to the servomotor 12. As shown in FIGS. 1, 2, 5 and 6, the actuator indicated generally at 66 is provided by a cylindrical chamber 67 in the servomotor housing 14 having a piston 68 therein mounted to move axially on the rod 64 of the mechanical connection between stick 60 and link 31. When the system is functioning in the automatic pilot mode or in manual mode operation where the valve 13 of the system is centered and there is no fluid pressure differential exerted on piston 15, it will be understood that the rod 64 reciprocates freely along the axis of the piston 68 with relation thereto. The system accordingly does not exert a continuous restraint on the movements of the stick 60 by the human pilot. The piston 68 of the feel means provided moves only with a differential fluid pressure input thereto. Piston 68 is accordingly movable axially with respect to the mechanical means and particularly as shown herein with respect to the reciprocating part or rod 64 part of the mechanical means connecting the stick 60 to the valve 13 carried by the housing 14. The engagement between the feel piston and rod of the mechanical means of the system may be effected at any location of the parts. The piston 68 of the feel means moves axially in the cylindrical chamber 67 provided in housing 14 with relation to the concentric slide rod 64 part of the mechanical means included in the system. The movable piston 68 of the feel actuator also includes two oppositely tapered clutch faces extending along its axis as respectively indicated at 69 and 70 in FIG. 5.

The engaging means included in the system connects the feel piston 68 to rod 64 to move the rod and accordingly impart artificial feel to the stick operatively connected to the rod that is held by the human pilot. This means of the system is dependent for its operation on a differential fluid pressure input to the feel means or actuator. The engaging structure shown in FIGS. 1, 2, 5 and 6, includes a clutch having coupling pieces in the form of a pair of pistons 71, 72 that are slideably mounted on rod 64 and are located in the feel cylinder 67 on the respective sides of the feel piston 68. Piston 71 includes an axially slotted coupling piece 73 with a tapered surface 74 adapted to engage the feel piston clutch face 69. The rod 64 of the mechanical means of the system is engaged by the surface of the coupling piece 73 that slides along the rod when it is crimped at its tapered end by engagement with the clutch face 69 of the feel piston. This engages the feel piston 68 to rod 64 through coupling piece 73 when piston 71 moves to the right as viewed in FIG. 5 and the engaged piston 68 and rod 64 move accordingly to impart artificial feel to the human pilot. The engagement in the opposite direction is effected by the identical cooperation of an axially slotted coupling piece 75 with a tapered surface 76 that is adapted to engage the piston clutch face 70. Piece 75 is also slideably mounted on rod 64 and is crimped to engage the rod when the surface 76 is in engagement with the tapered clutch face 70 of the feel piston. The axial slots provided in the pair of coupling pieces 73 and 75 are respectively indicated at 77 and 78. The provided engaging means accordingly includes a clutch having a pair of coupling pieces 73 and 75 that engage the feel piston 68 to the rod 64 portion of the mechanical means of the system. The springs 79 and 80 located in the feel cylinder 67 constitutes a means for biasing the respective coupling pieces 73, 75 in disengaged relation to the clutch faces of the feel piston.

The movements of the rod 64 that impart feel to stick controller 60 in the improved system are dependent on a differential fluid pressure input to the feel actuator 66 and the resultant operation of the coupling pieces 73, 75 of the engaging means in engaging the feel piston 68 to the rod. This type of movement occurs only when the system is conditioned for operation in the manual mode when the mode switch 54 is located in open position as shown in FIG. 7 where the circuit to relay 55 is open and switch 49 under the influence of spring 56 opens the circuit to the torque motor 46 of the automatic pilot. The input to link 31 of the mechanical means from the automatic pilot is nulled and the servomotor valve 13 is then controlled directly from the stick 60 through the described linkage. The system is accordingly conditioned for operation in the manual mode and the movements of rod 64 remain free until the valve 13 is moved to provide a differential fluid pressure input to the servomotor 12 to operate the elevators 11. In the manual operating mode, the system utilizes the differential fluid pressure input to the servomotor to operate the feel actuator 66.

The connection between the servomotor 12 and cylinder 67 of the feel actuator 66 shown in FIG. 2 is provided by a fluid flow line in the housing 14 having a control valve 81 therein. Valve 81 includes a stem 82 having lands 83, 84, 85, 86 and 87 thereon that are axially movable in a cylindrical opening provided for the same in the housing 14. The longitudinally slideable valve stem 82 of the control valve 81 is settable in three control positions with respect to the housing 14. The relative locations of the noted parts where the valve 81 is conditioned for operation in the manual mode is shown in FIG. 2. An alternative position for the three position valve 81 is shown in FIG. 3 where the stem 82 is settably conditioned for operation of the system in the automatic pilot mode where the feel device or actuator 66 is connected to the return fluid pressure passageway 28 independently of the servomotor 12. In the position of the valve 81 shown in FIG. 4, the stem 82 is automatically conditioned when the fluid pressure in the pressure passageway 24 drops below a predetermined limit to connect the feel device or actuator 66 and the servomotor 12 to the return fluid pressure passageway 28.

As shown in FIGS. 2, 3 and 4, the means for conditioning the line control valve 81 of the system includes a piston 88 in cylinder 89 of the housing 14 that is biased against the left hand end of the stem 82 by a spring 90. To overcome the bias of the spring 90, a piston 91 at the other end of the stem 82 operates in a cylinder 93 and a cooperating tandem arranged piston 92 operates in a cylinder 94 in the housing 14. In the manual mode in which the control valve parts are conditioned as shown in FIG. 2, the piston chamber 93 is connected to return pressure passageway 28 by way of passageways 95 and 96 through a connecting valve 97 whose stem 98 is biased to the right as viewed in FIG. 2 under the influence of a spring 99. In this condition of operation, a relay 100 whose coil is energized by way of lead 101 to supply lead 59, FIG. 7, when the system is functioning in the automatic pilot mode, is unenergized. The piston 92 as shown in FIG. 2 is biased to its left hand limit under pressure supplied to chamber 94 by the fluid under pressure supplied thereto by way of a passageway 102 that connects chamber 94 to fluid pressure passageway 24. The stem 82 is accordingly positioned in the manual mode, with an abutment 103 of the piston 91 urged against the piston 92 by the spring 90.

As shown in FIG. 2, in the manual mode of operation of the system, the servomotor 12 is connected to the feel actuator by the conditioned valve 81 through fluid flow lines that include passageway 104 to the feel actuator cylinder 67 to the left hand side of the coupling piston 71, the portion of the valve between lands 84 and 85, and passageway 105 to the servomotor. The other connection between the actuator 66 and servomotor 12 is by way of passageway 106 to the right hand side of the coupling piston 72, the valve 81 between the lands 86 and 87 and passageway 107 connecting with passageway 23. In operation in the manual mode, the rod 64 that extends through the feel actuator 66 is free of the coupling pieces 73 and 75 as well as the feel piston 68 until the stem 29 of the servomotor control valve 13 is moved to provide a differential fluid pressure input to the servomotor 12. Through the connections provided to the feel actuator 66 from the servomotor, a proportional pressure differential couples the feel piston 68 to the rod 64 and imparts motion to the stick controller 60 that is felt by the human pilot during craft maneuvering operations.

In automatic pilot operations of the system, the mode switch 54 is closed to supply energy from the battery 57 to the relay 100 of the conditioning valve 97 so that the stem 98 is moved to the left as viewed in FIG. 2 against the influence of the spring 99. This connects the chamber 93 of piston 91 to the fluid pressure source passageway 24 by way of passageway 108, through the valve 97 between the lands thereof, and connecting passageway 95. As shown in FIG. 3, this further compresses the spring 90 so that the lands 85 and 87 respectively cover the passageways 105 and 107 to the servomotor to block the connections between the servomotor and feel device or actuator. The feel actuator 66 is then connected to the return pressure passageway 28 through the valve 81. One of such connections includes passageway 104, a groove 109 in housing 14 for bypassing the land 84 and a passageway 110 between lands 83 and 84 to the return passageway 28. The other of such connections includes passageway 106, a groove 111 in housing 14 for bypassing the land 86, and a central passage 112 in the stem 82 with an opening 113 between the lands 86 and 85 and an opening 114 between lands 84 and 83 to the return passageway 110. In the automatic pilot of operation, the line valve 81 is accordingly conditioned to connect the feel device or actuator 66 to the return fluid pressure passageway independently of the servomotor 12. In this mode, the feel actuator 66 offers no resistance to the operation of stick 60 by the human pilot.

To prevent fluid lock under emergency conditions of operation of the system where the fluid pressure in pressure passageway 24 drops below a predetermined limit, it is necessary to provide a release for the fluid in the respective chambers of both the feel actuator 66 and the servomotor 12. This is accomplished automatically in the improved system by pressure dependent means including the bias spring 90 for the valve stem 82 and the respective pistons 91 and 92. With loss in fluid pressure in the system, both piston chambers 93 and 94 have insufficient fluid pressure thereon to hold the pistons 91, 92 in either of the positions thereof shown in FIGS. 2 and 3. Spring 90 is then effective to move the stem 82 until the piston abutment 115 contacts the end wall of the chamber 94 and the valve 81 is conditioned in its third operative position as shown in FIG. 4. In this condition, the feel actuator 66 is connected to return passageway 110 from one side of the piston 68 through passageway 104, a groove 116 in the cylindrical wall of valve 81 bypassing land 84 and the valve stem between the lands 83, 84. On the other side of the piston 68, the connection includes passageway 106, a groove 117 in the cylindrical wall of valve 81 bypassing the land 86, through the passage 112 with the opening 113 between the lands 85 and 86, and from the opening 114 in the stem between the lands 84, 83. The left hand cylinder of the servomotor 12 is connected to return passageway 110 through the valve 81 by way of passageway 105, the valve 81 between lands 84, 85 and the bypassing groove 116 for land 84 to the valve 81 between the lands 83, 84. The right hand cylinder of the servomotor 12 is connected to return passageway 110 through the valve 81 by way of passageway 107, the valve between lands 86, 87, the bypassing groove 117 to the valve between lands 85, 86, and through the passage 112 with the opening 113 between the lands 85, 86 to the opening 114 between the lands 83, 84. The extension of the passage 112 in valve stem 82 in alignment with the axial passage and the opening in the end of piston 88 abutting the end of the stem 82 are for the purpose of insuring that there is no fluid lock between the piston 88 and the housing 14.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a manual booster servo system for maneuverable craft, a servomotor responsive to a differential fluid pressure input, a valve for controlling the differential fluid pressure input to the servomotor operable to move the craft about an axis, a manual controller, a mechanical connection between the controller and the servomotor valve having a rod part, differential fluid pressure responsive feel means having a piston movable axially on the rod part of the mechanical connection, means responsive to a differential fluid pressure input to said feel means including a clutch for coupling the piston of the feel means to the rod part of the mechanical connection to impart artificial feel to the controller, a fluid flow line between the servomotor and feel means having a control valve, and means for conditioning the line control valve to connect the servomotor to the feel means for operation in accordance with the differential fluid pressure input to the servomotor.

2. In a manual booster servo system for maneuverable craft, a servomotor of the differential fluid pressure input type for controlling the attitude of the craft about an axis; mechanical means for operating the servomotor including a control valve providing a differential fluid pressure input thereto, a link having an output connection to said servomotor control valve and an input, a rod connected to provide the input to the link and a manually operable stick connected to the rod; a differential fluid pressure responsive feel actuator having a piston movable axially on the rod connection of the mechanical means, means dependent on a differential fluid pressure input to said feel actuator including a clutch for coupling the feel piston to the rod of the mechanical means to impart artificial feel to the stick, and means for operating said feel actuator in accordance with the differential fluid pressure input to the servomotor.

3. A system of the character claimed in claim 2, in which the piston of the actuator includes two oppositely tapered clutch faces, and the clutch includes a pair of coupling pieces slideably mounted on the rod to engage the respective tapered clutch faces of the piston, and means for biasing the respective coupling pieces in disengaged relation to the clutch faces of the piston.

4. In a manual booster servo system for maneuverable craft, a servomotor of the differential fluid pressure input type for controlling the attitude of the craft about an axis, means for operating the servomotor including a control valve providing a differential fluid pressure input thereto, mechanical means connected to operate said servomotor control valve including a control sitck and a connecting rod, a differential fluid pressure responsive feel actuator having a piston movable axially on the connecting rod of said mechanical means, means dependent on a differential fluid pressure input including a clutch for coupling the feel piston to the connecting rod of the mechanical means to impart artificial feel to the stick, a fluid flow line between the servomotor and feel actuator having a control valve therein, and means for conditioning said line control valve to connect the servomotor to the feel actuator.

5. In a servo system of the class described, a servomotor having relatively movable housing and piston parts, means for operating the servomotor including a valve carried by the servomotor housing for controlling a differential fluid pressure input to the servomotor, mechanical means having a reciprocating rod carried by said housing connected to provide a manual input to the servomotor control valve, a differential fluid pressure responsive feel actuator having a piston movable axially in a cylinder in the housing on the reciprocating rod of the mechanical means, means dependent on a differential fluid pressure input to the feel actuator including a clutch for coupling the feel piston to the reciprocating rod of the mechanical input means to impart artificial feel thereto, and a fluid flow line connecting the feel actuator to the servomotor to operate the feel piston in accordance with the differential fluid pressure input to the servomotor.

6. A system of the character claimed in claim 5, in which the piston of the actuator includes two oppositely tapered clutch faces extending along its axis, and the clutch includes a first coupling piece having a tapered surface adapted to engage one of the piston clutch faces and a surface adapted to engage the rod, a second coupling piece having a tapered surface adapted to engage the other of the piston clutch faces and a surface adapted to engage the rod, and spring means for biasing the coupling pieces in disengaged relation to the clutch faces of the piston.

7. In a servo system of the class described, a servomotor of a differential pressure fluid input type, means for operating the servomotor including a control valve providing a differential fluid pressure input thereto, mechanical means connected to provide a manual input to the servomotor control valve including a reciprocating rod, a differential fluid pressure responsive actuator having a piston movable axially on the rod of the mechanical input means, means dependent on a differential fluid pressure input to the actuator for coupling the piston of the feel actuator to the rod of the mechanical input means to impart artificial feel thereto, and a fluid flow line between the servomotor and actuator for operating the piston in accordance with the differential pressure input to the servomotor.

8. A combined manual booster and automatic pilot servo system for maneuverable craft including a servomotor of the differential fluid pressure input type, a control valve connected to a supply fluid pressure passageway and a return fluid pressure passageway providing a differential pressure fluid input to the servomotor to move the craft about an axis, a differential link having an output for operating said servomotor control valve and two inputs, means connecting one of the inputs to the differential, link including an automatic pilot, a manual controller and a mechanical connection having a reciprocating rod connecting the other input to the differential link from the controller, a device for imparting artificial feel to the manual controller having a piston movable axially on the rod of the mechanical connection responsive to differential fluid pressure, means dependent on a differential fluid pressure input to the device including a clutch for coupling the piston to the rod of the mechanical controller connection, a fluid flow line with a passageway between the artificial feel device and servomotor and a passageway to the return fluid pressure passageway having a two position valve that in a manual mode position connects the feel device to the servomotor for operation in accordance with the differential fluid input to the servomotor and that in an automatic pilot position connects the feel device to the return fluid pressure passageway independently of the servomotor, and means for conditioning the line control valve in either of its operative positions.

9. A combined manual booster and automatic pilot servo system for maneuverable craft including, a servomotor of the differential fluid pressure input type, a control valve connected to a supply fluid pressure passageway and a return fluid pressure passageway providing a differential fluid pressure input to the servomotor to move the craft about an axis, a differential link having an output for operating said servomotor control valve and two inputs, means connecting one of the inputs to the differential link including an automatic pilot, a manual controller and a mechanical connection having a reciprocating rod connecting the other input to the differential link from the controller, a device for imparting artificial feel to the manual controller having a piston movable axially on the rod of the mechanical connection responsive to differential fluid pressure, means dependent on a differential fluid pressure input to the device including a clutch for coupling the piston to the rod of the mechanical controller connection, a fluid flow line with a passageway between the artificial feel device and the servomotor and a passageway to the return fluid pressure passageway having a three position valve that in a manual mode position connects the feel device to the servomotor for operation in accordance with the differential fluid pressure input to the servomotor, that in an automatic pilot position connects the feel device to the return fluid pressure passageway independetnly of the servomotor, and that in a third position connects the servomotor and feel device to the return fluid pressure passageway, means for alternatively conditioning the line control valve in its respective manual mode and automatic pilot operative positions, and pressure dependent means for automatically conditioning the line control valve in its third operative condition when the supply fluid pressure in the supply pressure passageway drops below a predetermined limit.

References Cited in the file of this patent
UNITED STATES PATENTS

| | | |
|---|---|---|
| 2,345,531 | De Ganahl | Mar. 28, 1944 |
| 2,530,659 | Hill | Nov. 21, 1950 |
| 2,738,772 | Richter | Mar. 20, 1956 |